United States Patent [19]

Proesel

[11] Patent Number: 5,335,338
[45] Date of Patent: Aug. 2, 1994

[54] GENERAL PURPOSE PARALLEL PORT INTERFACE

[75] Inventor: Ronald J. Proesel, DeKalb, Ill.

[73] Assignee: Micro Solutions, Inc., DeKalb, Ill.

[21] Appl. No.: 708,512

[22] Filed: May 31, 1991

[51] Int. Cl.⁵ .............................................. G06F 13/00
[52] U.S. Cl. ................. 395/500; 364/236.2; 364/248.1; 364/DIG. 1
[58] Field of Search ............... 395/DIG. 1 MS File, 395/DIG. 2 MS File, 500, 800, 200, 275, 325

[56] References Cited

U.S. PATENT DOCUMENTS 4,639,863  1/1987  Harrison et al. ............. 364/DIG. 1

OTHER PUBLICATIONS

Pacific Rim Systems advertisement on p. 96 of Byte Magazine, Oct. 1988.
"Hard Drive to go What's New" Portable Computer Review (Apr. 1, 1990), vol. 5, No. 4, p. 61.
Cohen, Alan "New and Improved: News of announced products and upgrades" PC Magazine vol. 9, No. 2 (Jan. 30, 1990) pp. 53–57.
Iomega Corporation "The New Bernoulli Any System, Any Place" Byte (Nov. 1990).
Advertisement, p. 57, *PC LapTop*, Aug. 1991.
Advertisement, on or about Jun. 18, 1991, of Valitek Mountain Farms.
Advertisement of Xircom, Inc. (Undated)—Copyright notice of 1991.

*Primary Examiner*—Robert B. Harrell
*Attorney, Agent, or Firm*—Wood, Phillips, VanSanten, Hoffman & Ertel

[57] ABSTRACT

A general purpose interface is provided for connecting a floppy disk drive to a parallel port of a personal computer. The interface comprises an interface circuit and software driver circuit operated by the CPU. The interface circuit emulates the internal bus circuit in the CPU and can be used with virtually any disk controller. The interface circuit uses gate arrays as state machine logic elements to perform various functions, eliminating requirements for a microprocessor and plural memory chips.

20 Claims, 6 Drawing Sheets

GENERAL PURPOSE PARALLEL PORT INTERFACE

FIELD OF THE INVENTION

This invention relates to personal computer systems and, more specifically, to a general purpose parallel port interface therefor.

BACKGROUND OF THE INVENTION

Microcomputers have found widespread use owing to technological improvements providing substantial computing power at low cost. The most common form of microcomputer is referred to as a personal computer owing to the intended marketplace. A typical personal computer comprises a central processing unit (CPU) including a microprocessor chip and random access memory (RAM) and read only memory (ROM) for storing programs and data to be used by the CPU. The CPU is typically connected to one or more disk drives for providing permanent mass storage of data and application programs. To provide a user interface, each system typically includes connectors for connecting to a keyboard as well as to a video display monitor. The CPU implements programmed instructions stored in the memory to manipulate data. During operation, the programs are stored in the RAM. However, when not being used the programs and data are generally stored either on a hard disk drive, a floppy disk usable in a floppy disk drive, or on a tape readable via a tape drive.

A typical CPU, such as in an IBM compatible personal computer, includes a main circuit board providing connections between the microprocessor and RAM and ROM memory as well as suitable address, data and control buses. Expansion slots are provided on the main circuit board for connection via interface circuit boards to peripheral devices. A standard computer configuration includes interface boards for connection to the monitor as well as providing input/output (I/O) interface boards. A typical I/O interface board includes one or more parallel ports and/or serial ports. The parallel port is typically used for connecting to a parallel printer, while the serial port is typically used for connecting to a serial printer, modem or other peripheral device.

Often, it is desirable to add peripherals to an existing personal computer system. A printer or modem can be purchased and readily connected to either the parallel port or serial port, as required. Adding mass storage devices, such as floppy drives, hard drives or tape drives can be more complicated. Usually, it is necessary to open up the CPU to add interface cards and/or install the drive. While such an operation can be readily performed by one skilled in servicing personal computers, the same can be difficult and frustrating for one not so skilled.

The present invention is intended to overcome one or more of the problems discussed above in a novel and simple manner.

SUMMARY OF THE INVENTION

In accordance with the invention there is provided a general purpose interface for connecting a mass memory storage device to a parallel port of a personal computer.

Broadly, such a general purpose interface comprises a cable for connection to a parallel port of a personal computer to transfer data and control signals to and from the personal computer. A peripheral port connects to a peripheral controller for a mass memory storage device to transfer data and control signals to and from the peripheral controller. A random access memory circuit stores data to be transferred between the storage device and the personal computer. A parallel port controller is electrically coupled to the cable, the peripheral port and the memory circuit. The parallel port controller includes decoding means for decoding control signals from the personal computer and control means responsive to the decoded control signals for generating control signals to the memory circuit and the peripheral port to control transfer of data between any of the cable, the peripheral port and the memory circuit, the control means including a direct memory access channel to control transmission of data between the memory circuit and either the peripheral port or the cable.

In one aspect of the invention, the general purpose interface is provided for connecting a floppy disk drive to a parallel port of a personal computer. The interface comprises an interface circuit and software driver circuit operated by the CPU. The interface circuit emulates the internal bus circuit in the CPU and can be used with virtually any disk controller. The interface circuit uses gate arrays as state machine logic elements to perform various functions, eliminating requirements for a microprocessor and plural memory chips.

It is a feature of the invention that the interface can be used to connect to a plurality of different disk controller chips for different applications, such as different floppy drives, hard drives or tape drives.

Further features and advantages of the invention will readily be apparent from the specification and from the drawings.

DETAILED DESCRIPTION OF THE INVENTION

Figure 1:
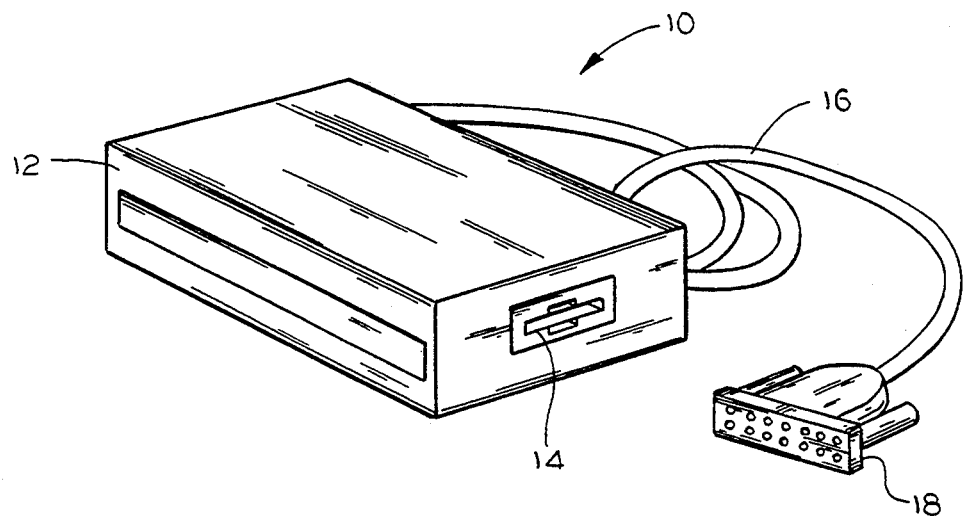
FIG. 1 illustrates a floppy drive including a general purpose parallel port interface according to the invention.

Referring to FIG. 1 there is illustrated an external floppy drive 10 including a general purpose parallel port interface according to the invention for connection to a parallel port of a personal computer for facilitating data transfer between the floppy drive and a central processing unit of the personal computer.

The floppy drive 10 comprises a housing 12 housing a floppy disk drive unit 14. The floppy disk drive unit 14 may be, for example, a conventional 3.5 inch or 5.25 inch high or low density model floppy drive. The housing 12 also houses the general purpose interface, discussed more specifically below. A cable 16 extends from the housing 12 and includes a conventional connector 18 for connecting to an IBM compatible personal computer parallel port. Consequently, the floppy drive 10 can be added if expansion slots are not available, and even if available, without using the same.

Figure 2:
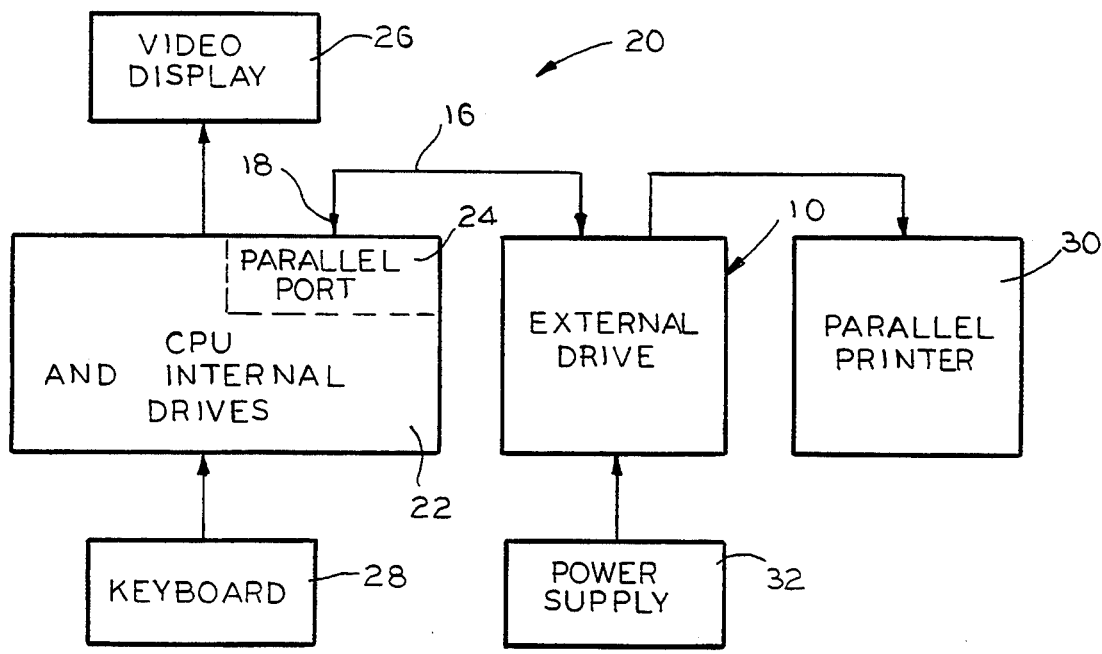
FIG. 2 is a block diagram illustrating connection of the drive of FIG. 1 to a personal computer system.

With reference to FIG. 2, a block diagram illustrates interconnections of the drive 10 in a personal computer system 20. The system 20 includes a CPU 22 having internal drives as well as conventional microprocessor chip, memory and other circuits. As disclosed herein, the external drive 10 is intended to be used with a CPU for virtually any IBM compatible personal computer including a parallel I/O port 24. The system 20 also includes a video display 26 and keyboard 28, as is conventional, connected to the CPU 22.

Ordinarily, a parallel printer 30 is connected to the parallel port 24 for providing hard copy printouts. In accordance with the invention, the external drive 10 is connected via the cable 16 and connector 18 to the parallel port 24. The parallel printer 30 is in turn connected to a suitable connector provided in the external drive 10. As such, the parallel port 24 is used for both an external floppy drive and a parallel printer connection. A power supply 32 is also connected to the external drive 10 for providing power to the same.

Figure 3A:
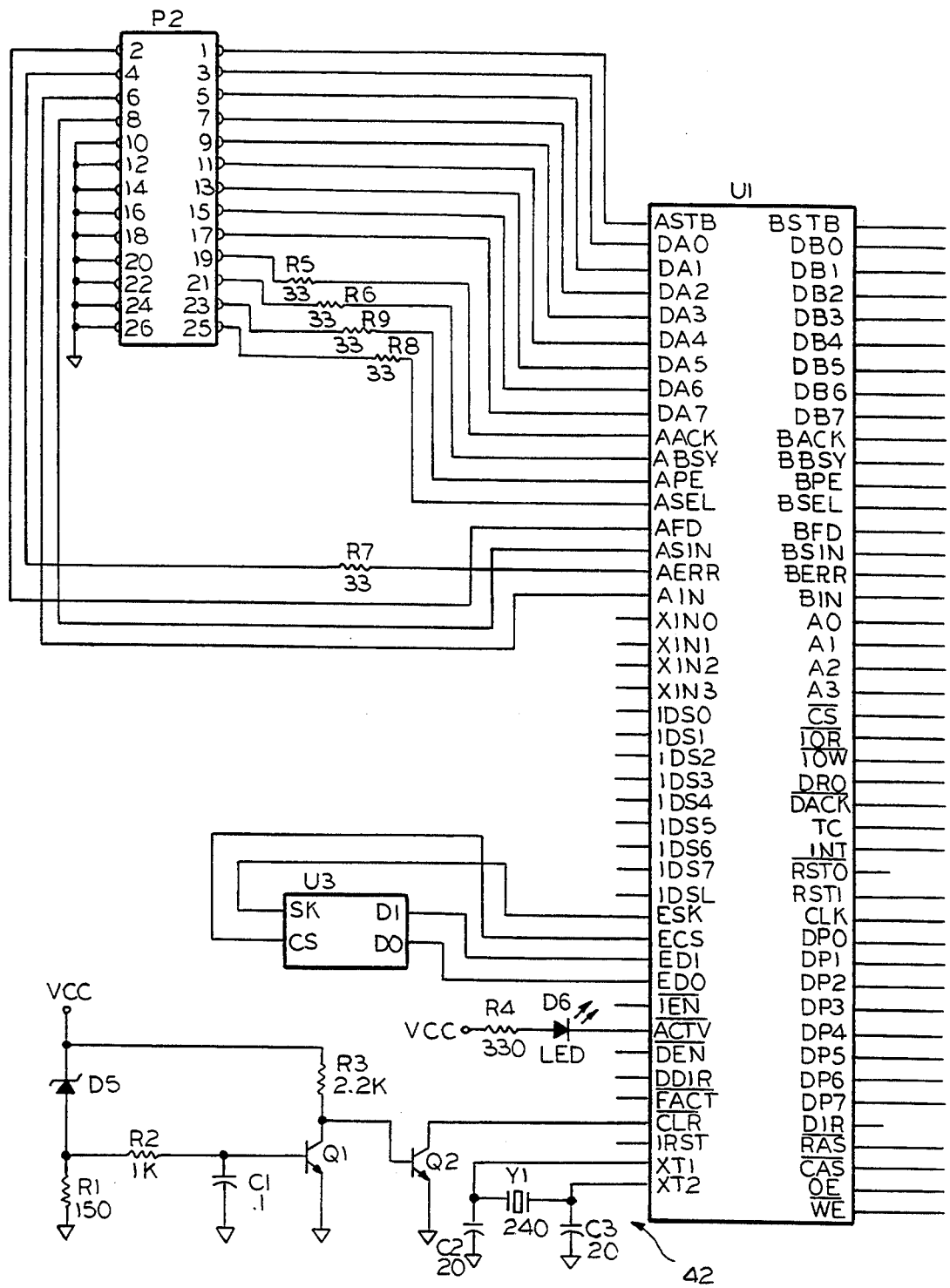
FIGS. 3A, 3B and 3C are a schematic diagram illustrating a circuit for the parallel port interface.
Figure 3B:
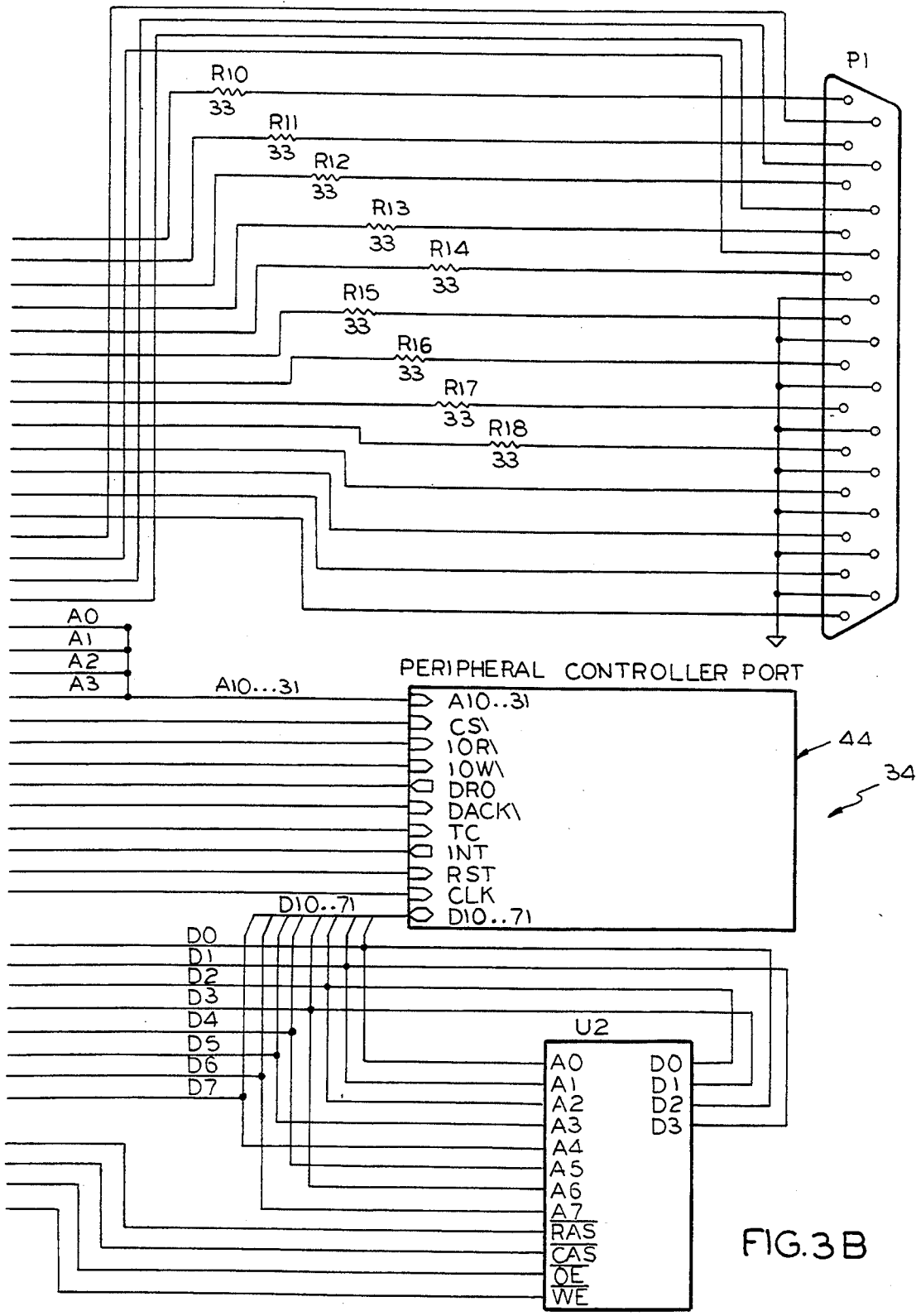
Figure 3C:
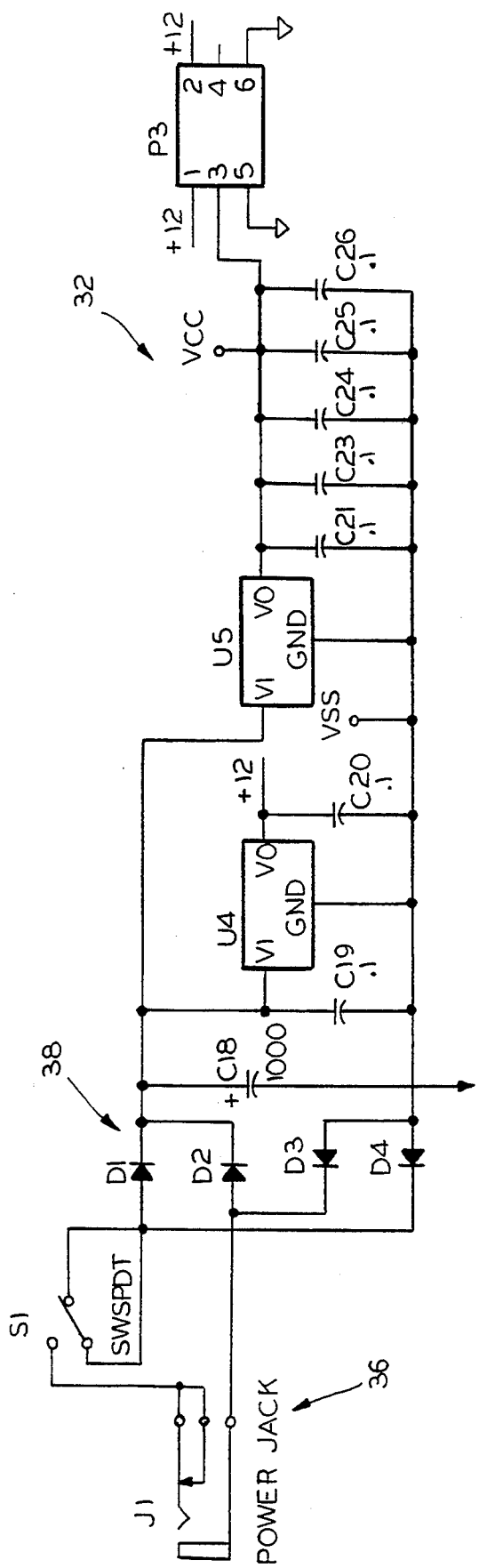

With reference to FIGS. 3A, 3B and 3C, an electrical schematic illustrates a circuit for a general purpose interface 34 of the external drive 10 and also the power supply 32.

The power supply 32 comprises a power jack 36 used for connection to a source of power and via an On/Off switch S1 to a rectifier circuit 38. The rectifier circuit 38 develops DC power connected to voltage regulator circuits U4 and U5 for providing +12 volt power and VCC power, respectively. The VCC power is used for powering the general purpose interface circuit 34. The +12 volt power is connected to a header P3 for powering the floppy disk drive unit 14.

The interface circuit 34 includes a twenty-six terminal header connector P2 for terminating the cable 16. The connector P2 is connected to a parallel port controller U1. This connection is used to transfer data and control signals to and from the CPU 22 via the parallel port 24. Such a parallel port 24 typically is used for transferring eight data bits, a strobe signal to the device, status signals to the device, and receiving input status signals from the device to the CPU 22. The parallel port controller U1 is in turn connected via suitable conductors to a connector P1 for connection to the parallel printer 30, see FIG. 2. In fact, when the external drive 10 is not being used for reading or writing data to the drive 14, the parallel port controller U1 effectively directly couples the connectors P2 and P1 together to enable normal printing operation via the parallel port 24.

A random access memory (RAM) circuit U2 is connected to the parallel port controller U1. The RAM circuit U2 may be, for example, a type 4464 dynamic RAM memory circuit including address and data bits connected to data ports from the parallel port controller U1. A non-volatile memory circuit U3 is also connected to the parallel port controller U1. The non-volatile memory circuit U3 defines the type of disk drive 14 being used. A power-up reset circuit 38 and clock circuit 40 are connected to the parallel port controller U1 for controlling operation of the same.

Finally, the interface circuit 34 includes a peripheral controller port 44. The peripheral controller port may comprise a socket or the like for installing a controller chip for a floppy disk, hard disk, tape drive or the like, as necessary. A peripheral controller is a conventional off-the-shelf circuit chip selected according to the type of peripheral device being used. The peripheral controller normally attaches to the main circuit bus of the CPU 22. In accordance with the invention, the peripheral controller port and parallel port controller U1 emulate the main circuit bus of the CPU 22.

Figure 4:
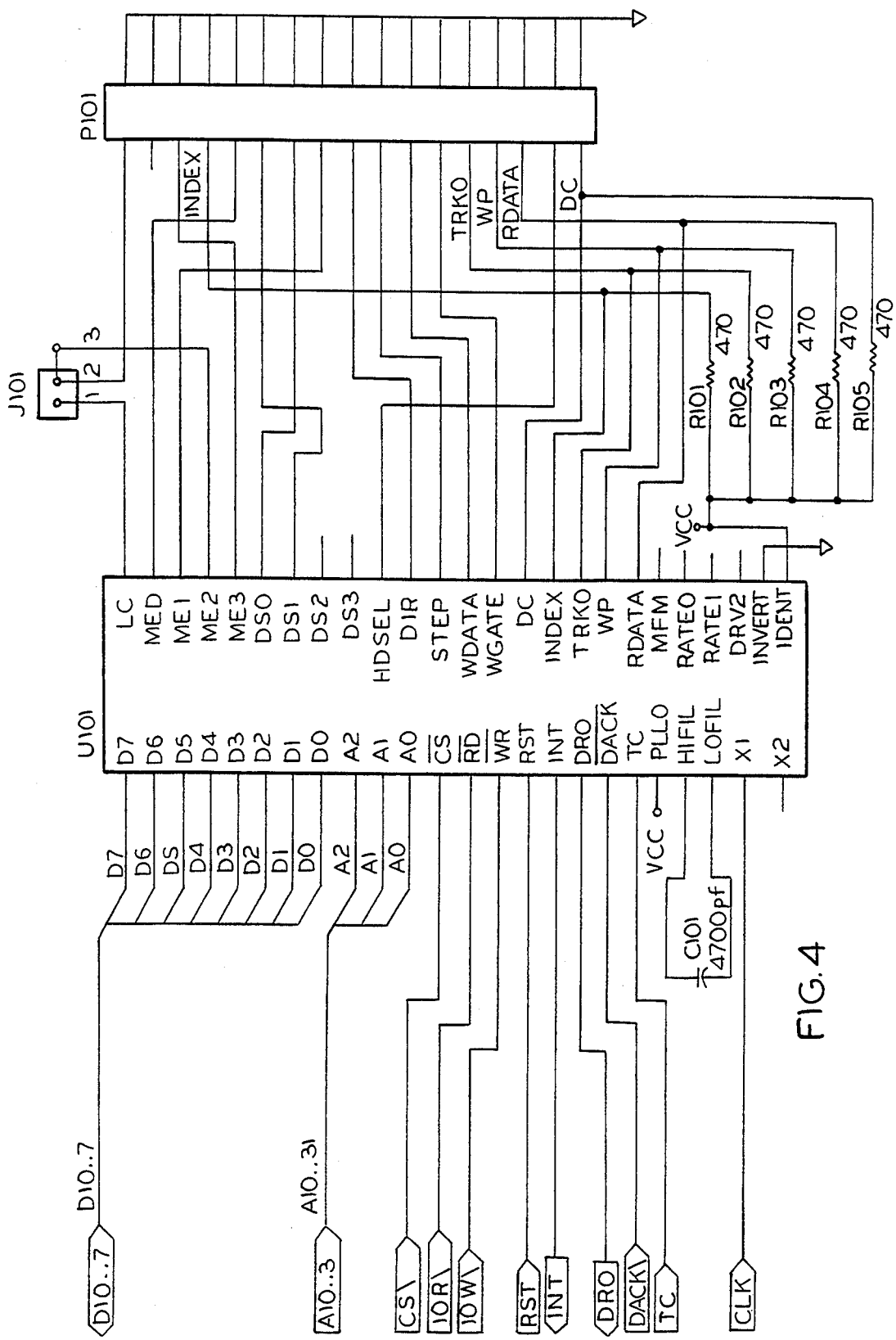
FIG. 4 is an electrical schematic illustrating a peripheral controller circuit and connections to a floppy drive and the peripheral controller port of FIG. 3.

With reference to FIG. 4, an electrical schematic illustrates connections of a peripheral controller chip U101 between the peripheral controller port 44, see FIGS. 3A, 3B and 3C, and a connector P101 to the drive 14. The controller chip U101 may be, for example, an 82077 floppy disk controller chip which is commercially available for interfacing to a floppy disk drive unit. The circuit of FIG. 4 is conventional for connecting such a controller chip U101 to a CPU bus and to a floppy drive unit 14.

As is apparent, the controller chip U101 may take one of many known forms according to the type of drive 14 utilized, such as the different types of floppy drives, hard drives or tape drives.

Figure 5:
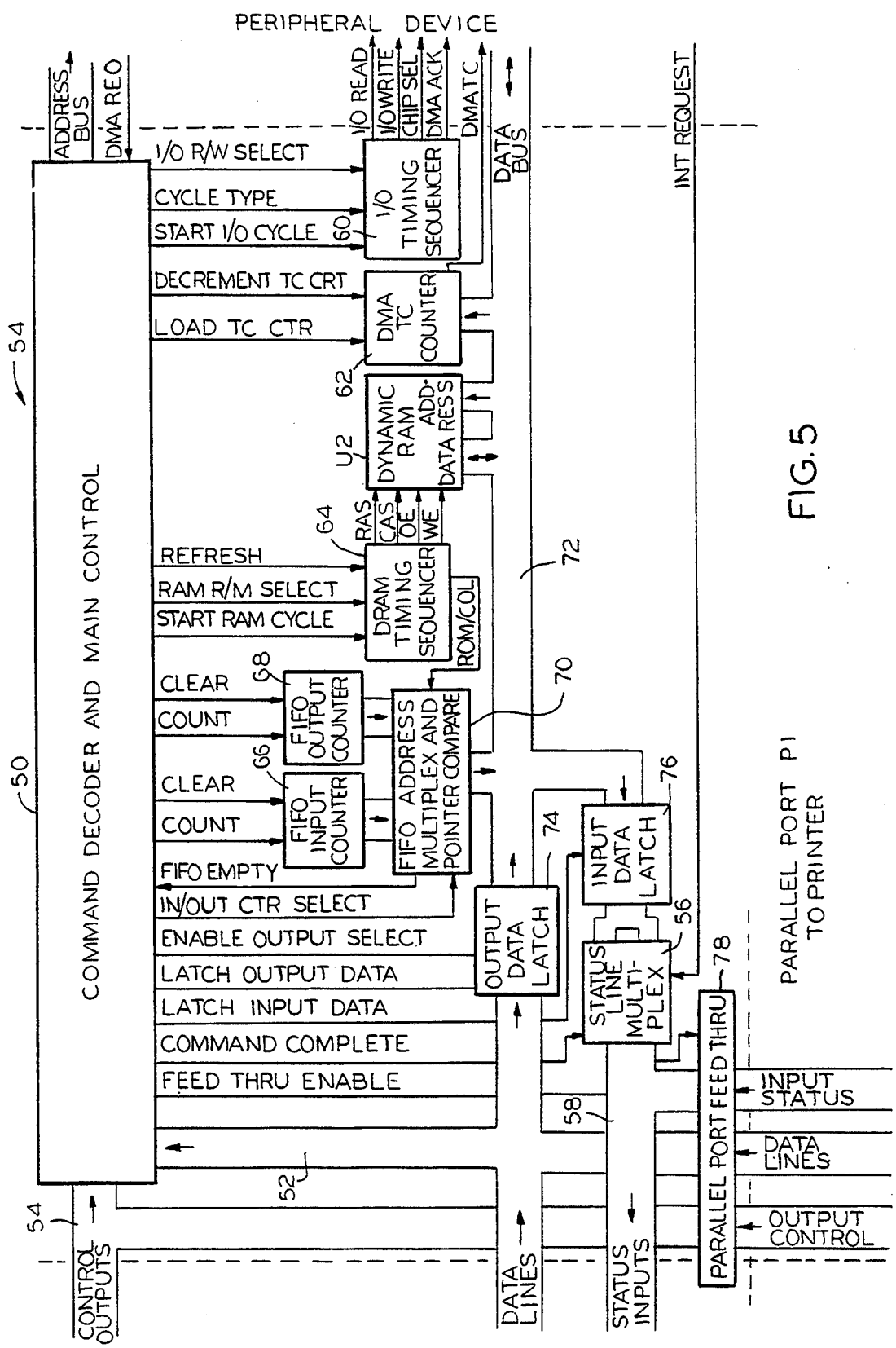
FIG. 5 is a functional block diagram illustrating implementation of the parallel port controller chip of FIG. 3.

The parallel port controller U1 is a gate array logic circuit using state machine logic elements to perform various functions. By using state machines, the requirement for a microprocessor and related memory circuits is eliminated. With a state machine, any given state can depend on the current state and any commands received. As a result, the control sequence can be modified by external events. For example, decisions can be based on inputs, current states and inputs, or current states alone. For example, with a counter, the counter is based on the current state, i.e., count value, plus or minus one according to whether the counter increments or decrements, as is well known. FIG. 5 comprises a functional block diagram illustrating the functional operation of the gate array logic circuit for the parallel port controller 34 and the dynamic RAM U2 in the system 20.

The parallel port controller U1 includes a command decoder and main control block 50 for receiving high level commands from the parallel port 24 and generating proper control signals to perform the commanded operation. The high level commands are received via parallel port data lines 52 and one of a plurality of parallel port control lines 54 is used to commence operation. When an operation is complete, a "COMMAND COMPLETE" line is asserted and transfer via a status line multiplex block 56 and via status input lines 58 to the parallel port 24.

The command decoder and main control block 50 is configured to support five high level commands. These commands include:

1) OUTPUT A BYTE TO THE PERIPHERAL
2) INPUT A BYTE FROM THE PERIPHERAL
3) WRITE A BYTE TO THE DMA BUFFER
4) READ A BYTE FROM THE DMA BUFFER
5) SET THE DMA TC COUNTER

Particularly, each command is assigned a four-bit code transmitted to the command decoder and main control block 50 via the upper four bits of the data lines 52. The lower four bits are used as address lines for the peripheral. These bits are used only for input and output operations. Otherwise, the lower four bits are ignored.

The command decoder and main control block 50 includes "I/O R/W (read/write) SELECT" "CYCLE TYPE" and "START I/O CYCLE" lines to an I/O timing sequencer block 60. The I/O timing sequencer block 60 generates peripheral device control signals for I/O and DMA operations. Particularly, the sequencer block 60 generates "I/O READ", "I/O WRITE", "CHIP SEL" and "DMA ACK" control signals to the peripheral device. The combination of the "I/O RW SELECT" and "CYCLE TYPE" lines determine the type of cycle generated. The four types of cycles are "I/O INPUT", "I/O OUTPUT", "DMA INPUT" and "DMA OUTPUT". The specific timing signals for these cycles are conventional and well known in the art.

Normally, when data is read from a peripheral device, such as a disk drive, the data is read from a particular sector. The data is read much too quickly for a CPU. In accordance with the invention, the parallel port controller 34 includes a direct memory access (DMA) channel which relieves the CPU of the burden of reading data and writing it to memory. The DMA channel predefines memory storage locations to write directly from the peripheral to the dynamic RAM U2 or conversely to read data directly from the RAM U2 to the peripheral device. Particularly, the parallel port 24 is not fast enough to transfer data at the same speed as the peripheral device. The DMA channel captures data at high speed from the peripheral device and transfers it at slower speeds to the parallel port 24. Thus, the parallel port controller 34 emulates a personal computer with a DMA circuit and uses the dynamic RAM U2 as a DMA buffer. The particular size of the DMA buffer can be selected as necessary 10 for a particular application. For example, the RAM U2 can be sized minimally to hold one sector of data from the drive unit 14.

To implement the DMA channel, the command decoder and main control block 50 includes "LOW TC CTR" and "DECREMENT TC CTR" lines connected to a DMA terminal count (TC) counter 62. The DMA TC counter is used to signal the peripheral device via a "DMA TC" line when it has transferred the correct amount of data. The counter 62 is loaded by a high level command to the desired count and is decremented every time a DMA cycle is performed. When the count reaches zero, the DMA TC line is set and the peripheral stops performing DMA transfers. The "DECREMENT TC CTR" line decrements the counter and is generated by the main control block 50 whenever a DMA cycle is performed.

A DRAM timing sequencer block 64 is used to generate the dynamic RAM and address multiplexer signals. The sequencer 64 is controlled by "START RAM CYCLE", "RAM R/W SELECT" and "REFRESH" lines from the command decoder and main control block 50. The combination of the "RAM R/W SELECT" and "REFRESH" lines determines the type of cycle generated. The three possible types of cycle are READ, WRITE and REFRESH. The REFRESH is a "CAS BEFORE RAS" cycle since no REFRESH counter is provided. The specific timing signals for these cycles are conventional in nature and well known to those skilled in the art.

The DMA buffer is implemented as a first-in, first-out (FIFO) memory. FIFO memory implementations require two address pointers or counters, namely an input counter block 66 and an output counter block 68. The input counter block 66 is used to select the next memory location to write data into, while the output counter block 68 selects the next memory location to read. The input counter usually exceeds the output pointer by one, as data must be written to memory before it can be read therefrom. If the two counters are equal, then the FIFO is empty as indicated to the command decoder and main control block 50 via a "FIFO EMPTY" line from a FIFO address multiplex and pointer compare block 70. A "COUNT" line into each counter block 66 and 68 increments the count and is generated by the main control block 50 whenever a DMA cycle transfer is performed. A "CLEAR" line from the main control block 50 to each counter block 66 and 68 is used to reset each counter before the start of a DMA operation.

The pointer compare block 70 is used to select which FIFO counter block 66 or 68 is used for the dynamic RAM operation. The selection is done in accordance with an "IN/OUT CTR SELECT" line from the command decoder and main control block 50.

The dynamic RAM circuit U2 requires addresses to be multiplexed into row and column addresses. This is accomplished by multiplexing half of the counter bits for the row address and the other half for the column address. The "ROW/COL" signal from the DRAM timing sequencer block 64 to the pointer compare block 70 selects which address should be placed on a data bus 72. The pointer compare block 70 also provides the "FIFO EMPTY" signal to the main control block 50 which should be set when the input and output counters are equal.

An output data latch block 74 connects the data lines 52 to the data bus 72. The block 74 is an eight-bit latch which is used to hold data to be used for I/O WRITE, DMA BUFFER WRITE, and SET TC COUNTER operations. The data is presented to the latch block 74 through the parallel port data lines 52. A "LATCH OUTPUT DATA" line from the main control block 50 is used to command the latch block 74 to hold data and can be controlled by one of the parallel port control output lines 54. An "ENABLE OUTPUT DATA" line is used to place data on the data bus 72.

An input data latch block 76 is an eight-bit latch which is used to hold data read by the I/O READ or FIFO READ commands. The input data comes from the data bus 72 and is presented to the status line multiplex block 56.

As discussed above, the data bus 72 is an eight-bit data bus. However, the parallel port includes only five status input lines. Therefore, the status line multiplex block 56 multiplexes the input data and sends it back to the 10 parallel port 24 four bits at a time. The fifth status line is used to return the "COMMAND COMPLETE" signal from the command decoder and main control block 50.

An interrupt request or "INT REQUEST" signal from the peripheral is used to pulse the "ACK" status line. The "ACK" line can be used to generate an interrupt to the CPU 22 enabling the peripheral to interrupt the same.

A parallel port feedthrough block 78 is used to pass parallel port signals to the port P1 and thus parallel printer 30, see FIG. 2, when commands for the peripheral device are not requested. This allows the printer 30 to be connected and used without restriction. A "FEED THROUGH ENABLE" signal from the command decoder and main control block 50 is used to gate the signals from the printer 30 to the parallel port 24. When the "FEED THROUGH ENABLE" is inactive, output signals from the parallel port 24 are latched and presented on the printer connector P1, see FIG. 3B, and input signals are ignored.

In order for the external drive 10 to be recognized by the personal computer system unit 22, a software driver circuit must be loaded in CPU memory. This is typically done at startup. The software is needed in the CPU to generate the high level commands to the command decoder and main control block 50. Two routines are used depending upon the direction of data transfer. A write routine is used for the following commands:
1) OUTPUT A BYTE TO THE PERIPHERAL
3) WRITE A BYTE T THE DMA BUFFER
5) SET THE DMA COUNTER; while a read routine is used for the following commands:
2) INPUT A BYTE FROM THE PERIPHERAL
4) READ A BYTE FROM THE DMA BUFFER.

Listed below is the pseudo code logic for implementation of the write and read routines. All output and input instructions are performed to conventional registers for the parallel port 24. The data register is used to send data and opcodes. The control register is used to strobe data and start command execution. The status register is used to read data and status information.

WRITE ROUTINE
=output the data byte to the parallel port data register
=set the data strobe bit in the control register
=output the command opcode to the data register
=set the start command bit in the control register
=wait for the command complete bit in the status register READ ROUTINE
=output the command opcode to the data register
=set the start command bit in the control register
=wait for the command complete bit in the status register
=read the low 4 bits of data from the status register
=set the upper 4 bit select bit in the control register
=read the upper 4 bits of data from the status register After a command from the CPU 22 is received and decoded, the command decoder and main control block 50 performs the operation by signalling the other blocks to perform various tasks. The following summarizes the sequence of control signals generated by the main control block 50 for each high level command:

"OUTPUT A BYTE TO THE PERIPHERAL"
1) Set "I/O R/W SELECT" to indicate a write operation.
2) Set "CYCLE TYPE" to indicate an I/O operation.
3) Set "ENABLE OUTPUT DATA" to place the data on the data bus 72.
4) Set "START I/O CYCLE" to perform the output operation.
5) Set the "COMMAND COMPLETE" signal.

"INPUT A BYTE FROM THE PERIPHERAL"
1) Set "I/O R/W SELECT" to indicate a read operation.
2) Set "CYCLE TYPE" to indicate an I/O operation.
3) Set "START I/O CYCLE" to perform the read operation.
4) Clock the "LATCH INPUT DATA" signal to latch the data.
5) Set the "COMMAND COMPLETE" signal.

"WRITE A BYTE TO THE DMA BUFFER"
1) Set "RAM R/W SELECT" to indicate a write operation.
2) Set "ENABLE OUTPUT DATA" to place the data on the data bus 72.
3) Set "START RAM CYCLE" to perform the write operation.
4) Set the "COMMAND COMPLETE" signal.

"READ A BYTE FROM THE DMA BUFFER"
1) Set "RAM R/W SELECT" to indicate a read operation.
2) Set "START RAM CYCLE" to perform the read operation.
3) Clock the "LATCH INPUT DATA" signal to latch the data.
4) Set the "COMMAND COMPLETE" signal.

"SET THE DMA TC COUNTER"
1) Set "ENABLE OUTPUT DATA" to place the data on the data bus 72.
2) Set "LOAD TC CTR" to load the counter.
3) Set the "COMMAND COMPLETE" signal.

As discussed above, the command decoder and main control block 50 also simulates a DMA channel for the peripheral. When a DMA operation is necessary, the data from the peripheral is transferred to the dynamic RAM U2, instead of the parallel port 24. This enables the peripheral to transfer data at a high data rate which the CPU 22 can access at a lower speed using the read/write DMA buffer commands, discussed above.

A DMA operation is requested by the peripheral asserting a "DMA REQ" line to the command decoder and main control block 50. Acceptance of the request is acknowledged by the main control block 50 asserting a "DMA ACK" signal via the I/O timing sequencer block 60. A DMA read operation occurs when data is read from the dynamic RAM U2 and written to the peripheral. A DMA write operation occurs when data is read from the peripheral and written to the dynamic RAM U2. The following summarizes the sequence of operations performed for DMA transfers:

"DMA READ TRANSFER"
1) Sense "DMA REQ" to signal a DMA operation.
2) Set "RAM R/W SELECT" to indicate a read operation.
3) Set "START RAMCYCLE" to perform the read operation.
4) Set "I/O R/W SELECT" to indicate a write operation.
5) Set "CYCLE TYPE" to indicate a DMA operation.
6) Set "START I/O CYCLE" to perform the output operation.

"DMA WRITE TRANSFER"
1) Sense "DMA REQ" to signal a DMA operation.
2) Set "I/O R/W SELECT" to indicate a read operation.
3) Set "CYCLE TYPE" to indicate a DMA operation.
4) Set "START I/O CYCLE" to perform the read operation.
5) Set "RAM R/W SELECT" to indicate a write operation.
6) Set "START RAM CYCLE" to perform the write operation.

During a DMA write transfer, the cycle is repeated until the DMATC counter block 62 is decremented to zero from the desired count loaded value, discussed above. The FIFO input counter 66 is used to select memory locations to write data into. Similarly, the FIFO output counter 68 is used to select the next memory location to read data from during a DMA read transfer operation until the two counters are equal, indicating that the DMA buffer is empty.

In operation, use of the external drive 10 does not differ from internal drives. Moreover, no internal connections are required. The parallel port for printer use is not lost as a parallel output port P1 is provided in the external drive 10. As the drive 10 and printer 30 are generally not used concurrently, no loss of efficiency results.

If more than one external drive 10 is desired the drives can be daisy chained via the parallel port P1.

Thus, in accordance with the invention there is disclosed a general purpose interface for connecting a mass memory storage device, such as a disk drive or tape drive, to a parallel port of a personal computer for facilitating data transfer between the storage device and the central processing unit of the personal computer. The interface emulates the CPU bus and its signals and includes a DMA channel and interrupt. Furthermore, the same is achieved without the use of an external CPU and related required memory circuits.

I claim:

1. A general purpose interface for connecting a mass memory storage device to a parallel port of a personal computer for facilitating data transfer between the storage device and a central processing unit of the personal computer, comprising:
   a cable for connection to the parallel port of the personal computer to transfer data, CPU control and status signals to and from the personal computer;
   a peripheral port for connection to a peripheral controller for the mass memory storage device to transfer data and interface control signals to and from the peripheral controller;
   a random access memory circuit for storing the data to be transferred between the storage device and the personal computer;
   a logic circuit electrically coupled to said cable, said peripheral port and said memory circuit, including decoding means for decoding the CPU control signals from said personal computer and control means responsive to the decoded CPU control signals for generating the interface control signals to said memory circuit and said peripheral port to control transfer of data between any of said cable, said peripheral port and said memory circuit, said control means including a direct memory access channel to control transmission of data between said memory circuit and either said peripheral port or said cable.

2. The general purpose interface of claim 1 wherein said logic circuit includes a data bus for transferring data between any of said cable, said peripheral port and said memory circuit.

3. The general purpose interface of claim 2 wherein said data bus is an 8 bit data bus and further comprising a latch circuit controlled by said control means for controlling transfer of data from data output lines of the parallel port via said cable to said data bus.

4. The general purpose interface of claim 2 wherein said data bus is an 8 bit data bus and further comprising a multiplex circuit controlled by said control means for controlling transfer of data from said data bus via said cable to status input lines of the parallel port.

5. The general purpose interface of claim 1 further comprising a floppy disk drive including a floppy disk controller operatively connected to said peripheral port.

6. The general purpose interface of claim 5 further comprising a housing for housing said floppy disk drive, said peripheral port, said memory circuit and said logic circuit and wherein said cable extends outwardly from said housing.

7. The general purpose interface of claim 1 wherein said direct memory access channel comprises a counter circuit controlled by said control means for counting amounts of data transferred from said memory circuit to said cable or said peripheral port.

8. The general purpose interface of claim 1 wherein said memory circuit comprises a dynamic random access memory circuit.

9. A general purpose interface for connecting a mass memory storage device to a parallel port of a personal computer for facilitating data transfer between the storage device and a central processing unit of the personal computer, comprising:
   a connector for connection to the parallel port of the personal computer to transfer data and CPU control signals to and from the personal computer;
   a peripheral port for connection to a peripheral controller for the mass memory storage device to transfer data and interface control signals to and from the peripheral controller;
   a random access memory circuit for storing the data to be transferred between the storage device and the personal computer;
   a logic circuit electrically coupled to said connector, said peripheral port and said memory circuit, including decoding means for decoding the CPU control signals from the personal computer, control means responsive to the decoded CPU control signals for generating the interface control signals to said memory circuit and said peripheral port to control transfer of data between any of said connector, said peripheral port and said memory circuit, said control means including a direct memory access channel to control transmission of data between said memory circuit and either said peripheral port or said connector.

10. The general purpose interface of claim 9 wherein said logic circuit includes a data bus for transferring data between any of said connector, said peripheral port and said memory circuit.

11. The general purpose interface of claim 10 wherein said data bus is an 8 bit data bus and further comprising a latch circuit controlled by said control means for controlling transfer of data from data output lines of the parallel port via said connector to said data bus.

12. The general purpose interface of claim 10 wherein said data bus is an 8 bit data bus and further comprising a multiplex circuit controlled by said control means for controlling transfer of data from said data bus via said connector to status input lines of the parallel port.

13. The general purpose interface of claim 9 further comprising a floppy disk drive including a floppy disk controller operatively connected to said peripheral port.

14. The general purpose interface of claim 9 further comprising a housing for housing said floppy disk drive, said peripheral port, said memory circuit and said logic circuit and a cable extending outwardly from said housing for connecting said connector to the parallel port.

15. The general purpose interface of claim 9 wherein said direct memory access channel comprises a counter circuit controlled by said control means for counting amounts of data transferred from said memory circuit to said connector or said peripheral port.

16. The general purpose interface of claim 9 wherein said memory circuit comprises a dynamic random access memory circuit.

17. A general purpose interface for connecting a mass memory storage device to a parallel port of a personal computer for facilitating data transfer between the storage device and a central processing unit of the personal computer, comprising:
- a first connector for connection to the parallel port of the personal computer to transfer data and CPU control signals to and from the personal computer;
- a second connector for connection to the parallel peripheral device;
- a peripheral port for connection to a peripheral controller for the mass memory storage device to transfer data and interface control signals to and from the peripheral controller;
- a random access memory circuit for storing data to be transferred between the storage device and the personal computer;
- a logic circuit electrically coupled to said first and second connectors, said peripheral port and said memory circuit, including decoding means for decoding the CPU control signals from the personal computer, control means responsive to the decoded CPU control signals for generating the interface control signals to said memory circuit and said peripheral port to control transfer of data between any of said connector, said peripheral port and said memory circuit, and feedthrough means controlled by said control means for operatively connecting said first and second connectors together if no command is received by said decoding means.

18. The general purpose interface of claim 17 further comprising a floppy disk drive including a floppy disk controller operatively connected to said peripheral port.

19. The general purpose interface of claim 18 further comprising a housing for housing said floppy disk drive, said peripheral port, said memory circuit, said second connector and said logic circuit and a cable extending outwardly from said housing for connecting said first connector to the parallel port.

20. The general purpose interface of claim 17 wherein said memory circuit comprises a dynamic random access memory circuit.

* * * * *